Patented Dec. 18, 1951

2,579,413

UNITED STATES PATENT OFFICE 2,579,413

AMIDES OF ORTHO TITANIC ACID

Thomas Boyd, Springfield, Mass., assignor to Monsanto Chemical Company, St. Louis, Mo., a corporation of Delaware No Drawing. Application October 21, 1949, Serial No. 122,843

11 Claims. (Cl. 260—429)

This invention relates to organic derivatives of ortho titanic acid. More particularly, the invention relates to amides of ortho titanic acid and to a process for preparing them.

An object of this invention is to provide new organic derivaties of ortho-titanic acid.

A further object is to provide amides of ortho titanic acid.

Another object is to provide a process for preparing amides of ortho titanic acid.

These and other objects are attained by reacting titanium disulfide with a primary or secondary amine under substantially anhydrous conditions.

The following examples are given in illustration and are not intended as limitations of the scope of this invention. Where parts are mentioned, they are parts by weight.

Example I

One mol of titanium disulfide in benzene solution was heated under refluxing conditions with four mols of aniline for about two hours at 50° C. under substantially anhydrous conditions. The benzene was then removed by distillation. The residue was dissolved in hot carbon tetrachloride, filtered and the filtrate was cooled. A crystalline solid was obtained having the formula:

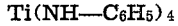

$Ti(NH-C_6H_5)_4$

Example II

One mol of titanium disulfide was reacted with about six mols of n-butyl amine at about 60° C. under reflux for two hours under substantially anhydrous conditions. The product was a solution of the tetrabutyl amide of ortho titanic acid in butyl amine. The solution was filtered and then vacuum-distilled to recover the reaction product which was a yellowish solid having the formula:

$Ti(NH-C_4H_9)_4$

Example III

One mol of titanium disulfide was dissolved in anhydrous benzene. Four mols of dry dibutyl amine were added to the solution which was then heated at 70° C. under reflux for two hours, filtered hot and subjected to vacuum distillation. The residue was dissolved in hot carbon tetrachloride, filtered and cooled. On cooling, a white crystalline solid was obtained having the formula:

$Ti[N(C_4H_9)_2]_4$

The products of this invention are obtained by reacting one mol of titanium disulfide with four mols of a primary or secondary amine. The organic radical of the amine may be aliphatic, aromatic or cyclic. They may be saturated or unsaturated. Examples of amines which may be used are ethyl amine, propyl amine, butyl amine, isobutyl amine, t-butyl amine, pentyl amines, octyl amines, lauryl amines, aniline, toluidine, benzyl amine, phenethyl amine, cyclohexyl amine, diethyl amine, dibutyl amine, dicyclohexyl amine, pyridine, quinolines, etc.

The reaction must be carried out under substantially anhydrous conditions at temperatures starting somewhat above room temperature, i. e., circa 50° C. When less reactive amines are used, it may be necessary to raise the temperature substantially above 50° C. The duration of the reaction is likewise dependent on the reactivity of the amine and also on the temperature. At the optimum temperature for each amine, the reaction may be completed in from one to two hours.

In most cases, it is advantageous to carry out the reaction in an inert hydrocarbon or halogenated hydrocarbon solvent such as xylene, benzene, naphtha hydrocarbons, carbon tetrachloride, etc. At the end of the reaction the solvent may be removed by distillation and the reaction product purified by dissolving it in hot carbon tetrachloride followed by crystallization.

The products of this invention are nearly all crystalline solids although some of the products made with the lower boiling amines are viscous liquids at room temperature. They are useful as stabilizers for organic thermoplastic materials since they combine mild alkalinity with the ability to filter ultra-violet light. They may be polymerized under carefully controlled conditions to provide modifiers for thermosetting coating resins. The products may also be used as mordants and water-repellents in the manufacture of textiles and paper.

It is obvious that many variations may be made in the products and processes of this invention without departing from the spirit and scope thereof as defined in the appended claims.

What is claimed is:

1. An amide of ortho titanic acid having the formula $Ti(NR_2)_4$ wherein R is an organic radical taken from the group consisting of aliphatic, aromatic and cyclic radicals and one R may be hydrogen.

2. Titanium tetra anilide.

3. The tetra butyl amide of ortho titanic acid.

4. The tetra dibutyl amide of ortho titanic acid.

5. A process which comprises reacting titanium disulfide under substantially anhydrous conditions with a compound taken from the group consisting of primary and secondary amines.

6. A process as in claim 5 wherein the amine is aromatic.

7. A process as in claim 6 wherein the amine is aniline.

8. A process as in claim 5 wherein the amine is an aliphatic primary amine.

9. A process as in claim 8 wherein in the amine is n-butyl amine.

10. A process as in claim 5 wherein the amine is a secondary aliphatic amine.

11. A process as in claim 10 wherein the amine is dibutyl amine.

THOMAS BOYD.

REFERENCES CITED

The following references are of record in the file of this patent:

FOREIGN PATENTS

| Number | Country | Date |
|--------|---------|------|
| 547,148 | Great Britain | Aug. 17, 1942 |

OTHER REFERENCES

Dermer: Chemical Reviews, vol. 14, 1934, page 402.